(12) United States Patent
Lewis, III et al.

(10) Patent No.: US 10,841,405 B1
(45) Date of Patent: Nov. 17, 2020

(54) DATA COMPRESSION OF TABLE ROWS

(71) Applicant: Teradata US, Inc, Dayton, OH (US)

(72) Inventors: Victor Lewis, III, Cary, NC (US); Bret M. Gregory, Raleigh, NC (US)

(73) Assignee: Teradata US, Inc., San Diego, CA (US)

( * ) Notice: Subject to any disclaimer, the term of this patent is extended or adjusted under 35 U.S.C. 154(b) by 716 days.

(21) Appl. No.: 14/211,803

(22) Filed: Mar. 14, 2014

Related U.S. Application Data

(60) Provisional application No. 61/799,061, filed on Mar. 15, 2013.

(51) Int. Cl.
*G06F 16/00* (2019.01)
*H04L 29/06* (2006.01)
*G06F 16/174* (2019.01)

(52) U.S. Cl.
CPC .......... *H04L 69/04* (2013.01); *G06F 16/1744* (2019.01)

(58) Field of Classification Search
CPC ...... G06F 3/0608; G06F 3/0665; G06F 3/067; G06F 17/30153; G06F 17/30501; G06F 3/061; G06F 12/1009; G06F 12/0246; G06F 12/0802; G06F 17/30292; G06F 17/30306; G06F 17/30312; G06F 17/30371; G06F 2212/50; G06F 2212/7201; G06F 3/0638; G06F 3/00
See application file for complete search history.

(56) References Cited

U.S. PATENT DOCUMENTS

| | | | | |
|---|---|---|---|---|
| 2006/0123035 A1* | 6/2006 | Ivie | ................... | G06F 17/30595 |
| 2009/0112889 A1* | 4/2009 | Lee | .......................... | H04L 49/90 |
| 2010/0325094 A1* | 12/2010 | Yang | ................. | G06F 17/30312 |
| | | | | 707/693 |

* cited by examiner

*Primary Examiner* — Yicun Wu
(74) *Attorney, Agent, or Firm* — Randy L. Campbell, Jr.

(57) ABSTRACT

A system may include a storage device configured to store a plurality of database tables. The system may further include a processor in communication with the storage device. The processor may receive a request to transmit a database table from the plurality of database tables. The database table may have a plurality of rows. The processor may determine if contents of each column row of each row of the database table are eligible to be compressed. For each column row that contains eligible contents, the processor may generate compressed data representative of the contents of a respective column row. The processor may remove the contents of the respective column row from the associated row. The processor may transmit the compressed data and the database table without content of the column rows represented by the compressed data. A method and computer-readable medium may also be implemented.

18 Claims, 8 Drawing Sheets

DATA COMPRESSION OF TABLE ROWS

CLAIM OF PRIORITY

This application claims the benefit of priority under 35 U.S.C. § 119(e) of U.S. Provisional Patent Application Ser. No. 61/799,061 filed on Mar. 15, 2013, which is hereby incorporated by reference herein in its entirety.

BACKGROUND

1. Technical Field

The present disclosure relates generally to compressing data, and more particularly to, compressing column rows of data for transmission.

2. Related Art

Data stores are collections of structured or unstructured data used for various purposes, such as record keeping or analytics. One such data store is a database, which is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

Tables, such as database tables, often require transmission across networks. Typically, a minimum amount of data for transmission to reduce costs, time, etc. In many tables, repetitive values or NULL values are present. When transmitting an entire table, these repetitive or NULL values must also be transmitted, which require a valuable amount of data. For example, a NULL value typically requires between 4 to 8 bytes depending on the how the NULL value was represented in the data. Reducing the amount of data to be transmitted would enable more efficient transmission of data to take place.

SUMMARY

According to one aspect of the present disclosure, a system may include a storage device configured to store a plurality of database tables. The system may further include a processor in communication with the storage device. The processor may receive a request to transmit a database table from the plurality of database tables. The database table may have a plurality of rows. The processor may determine if contents of each column row of each row of the database table are eligible to be compressed. For each column row that contains eligible contents, the processor may generate compressed data representative of the contents of a respective column row. The processor may remove the contents of the respective column row from the associated row. The processor may transmit the compressed data and the database table without content of the column rows represented by the compressed data.

According to another aspect of the disclosure, a method may include receiving a request to transmit a database table having a plurality of rows from the plurality of database tables. The method may further include retrieving the database table from a storage device. The method may further include determining if contents of each column row of each row of the database table are eligible to be compressed. The method may further include, for each column row that contains eligible contents, generating compressed data representative of the contents of a respective column row, removing the contents of the respective column row from the associated row, and transmitting the compressed data and the database table without content of the column rows represented by the compressed data.

According to another aspect of the disclosure, a computer-readable medium may be encoded with a plurality of instructions executable by a processor. The plurality of instructions may include instructions to receive a request to transmit a database table having a plurality of rows from the plurality of database tables. The plurality of instructions may further include instructions to retrieve the database table from a storage device. The plurality of instructions may further include instructions to determine if contents of each column row of each row of the database table are eligible to be compressed. The plurality of instructions may further include, for each column row that contains eligible contents, instructions to generate compressed data representative of the contents of a respective column row, instructions to remove the contents from the respective column row from the associated row, and instructions to transmit the compressed data and the database table without content of the column rows represented by the compressed data.

BRIEF DESCRIPTION OF THE DRAWINGS

The disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE FIGURES

Figure 1:
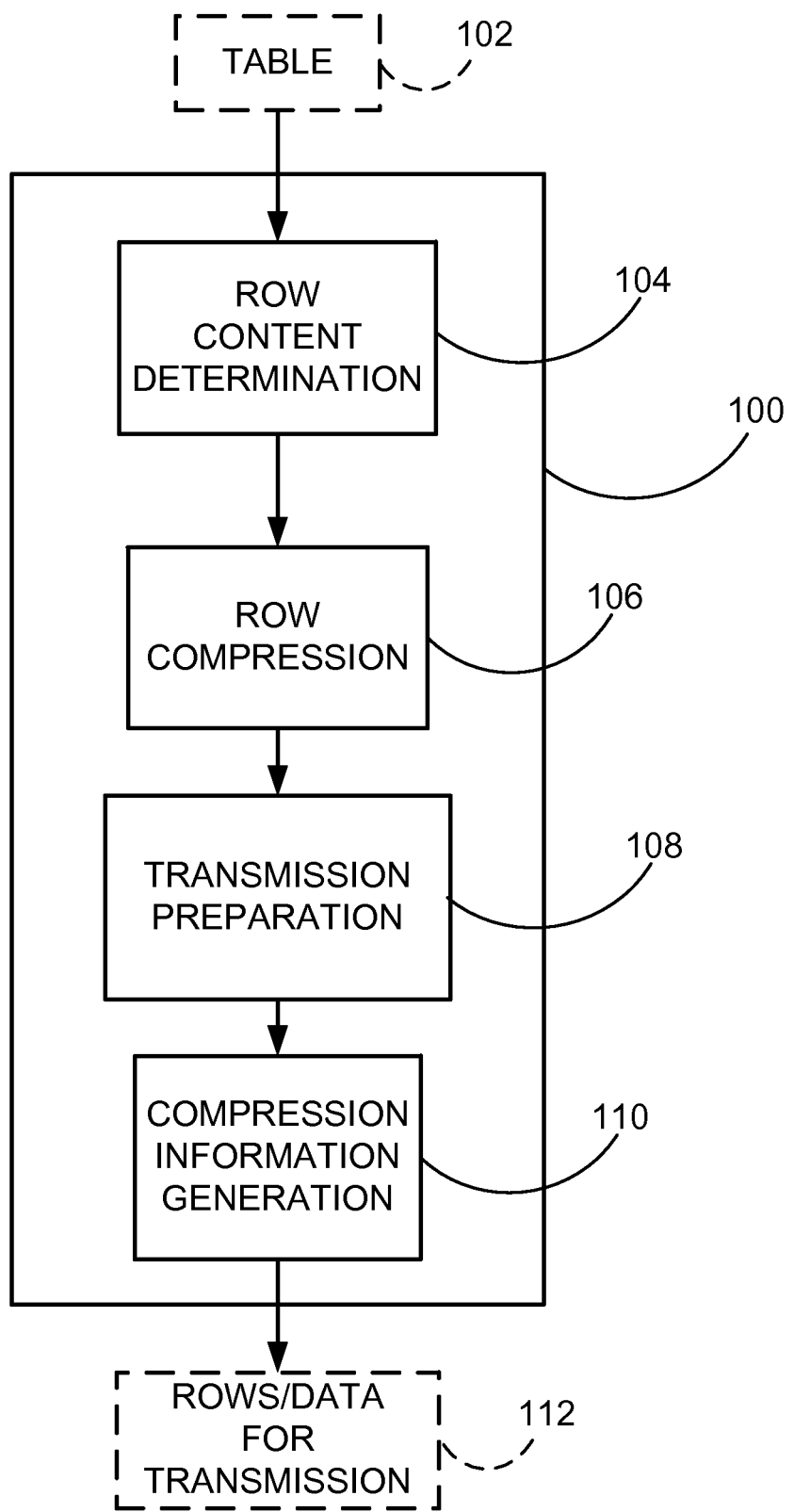
FIG. 1 is a block diagram of a data compression module.

FIG. 1 is a data compression module 100 that may be executable in a computing system. In one example, the data compression module 100 may compress data, such as database table 102 that may be included in a relational database management system (RBDMS), or other suitable data store system. In one example, the data compression module 100 may determine the contents of each row of a table 102 and compress data in the rows to reduce the amount of data transmitted between computing systems. The compressed data may be subsequently uncompressed when received at a particular destination.

In one example, the data compression module 100 may implement a number of sub-modules. These sub-modules may include a row content determination module 104. The row content determination module 104 may identify each row in any table 102 received by the data compression module 100. The row content determination module 104 may also determine the content in each column row in the identified row. The data compression module 100 may also include a row compression module 106. The row compression module 106 may determine which column rows of a row are eligible to be compressed and compress the eligible data in the column row. In one example, to compress data in a row, the row compression module 106 may identify contents of each column row eligible for compression and, if applicable, generate the compressed data representative of the contents of the column row.

Once all rows have been compressed, a transmission preparation module 108 may prepare the rows of the table 102 for transmission. Each column row that has contents compressed need not be transmitted to a destination, since the compressed data may be decompressed to reconstruct the corresponding contents of the column row. In such a scenario, the transmission preparation module 108 may remove the column row from the respective row. Thus, for each row being transmitted, the contents of each column row that has been compressed may be removed from the row for transmission.

The compression information generation ("CIG") module 110 may generate metadata associated with the rows to be transmitted. Typically, metadata may be included for transmission of complete tables without compressed data. The metadata may generally include information about associated data in a table. In one example, the CIG module 110 may include the compressed data, as well as a key for interpreting the compressed data to be used for reconstructing the compressed column rows in the metadata. The CIG module 110 may also include other information for the compressed data. All metadata for the table 102 may be created by the CIG module 110 or only a portion, such as the key and the compressed data. Once all rows have been analyzed for compression by the row compression module 106, the rows and associated data 112 may be transmitted for further manipulation.

Figure 2:
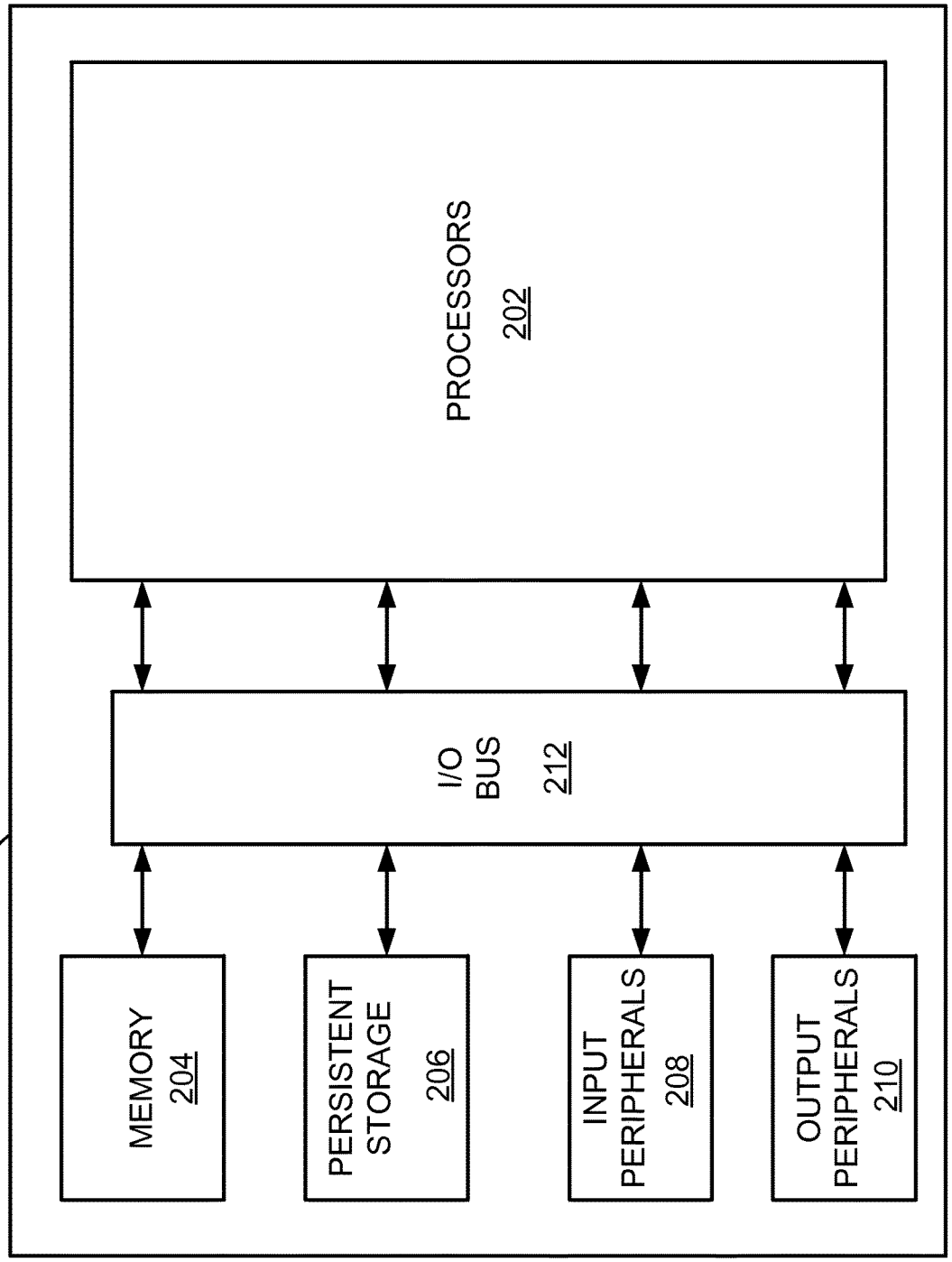
FIG. 2 is an example computer system.

An example computing system 200 is shown in FIG. 2. In one example, the computing system 200 may include one or more processors 202 and one or more memories 204. Memories 204 may include one or more memories and may be computer-readable storage media or memories, such as a cache, buffer, RAM, removable media, hard drive, flash drive or other computer-readable storage media. Computer-readable storage media may include various types of volatile and nonvolatile storage media. Various processing techniques may be implemented by the processors 202 such as multiprocessing, multitasking, parallel processing and the like, for example. The computing system 200 may also include persistent storage devices 206 accessible by the processors 202. The persistent storage devices 206 may include hard drives, flash drives, and/or other suitable persistent storage devices.

The computing system 200 may also include input peripherals 208. Input peripherals 208 may include any device or capability allowing input to be received by the processors 202, such as keyboards, touch screen interface, mice, microphone, or any other suitable input device. Output peripherals 210 may receive output generated by the processors 202, such as displays (monitors, projectors, etc.), printers, and/or other suitable output device. The processors 202 may communicate with the memory 204, persistent storage 206, input peripherals 208, and output peripherals 210 via an input/output (I/O) bus 212. The processors 202 may communicate directly and/or indirectly through the I/O bus 212. Communication through the I/O bus 212 may exist through direct connection, wireless connection, network connection, or any suitable combination thereof. The I/O bus 212 may represent a single or multiple I/O buses 212 used to direct communicate across associated components.

In one example, the computing system 200 may support and execute the data compression module 100. As described herein, each module, such as the data compression module 100 or any sub-module, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 204, for example, that comprises instructions executable with the processor 202 or other processor to implement one or more of the features of the module. When any one of the modules include the portion of the memory 204 that comprises instructions executable with the processor 202, the module may or may not include the processor 202. In some examples, each module may just be the portion of the memory 204 or other physical memory that comprises instructions executable with the processor 202 or other processor to implement the features of the corresponding module without the module including any other hardware. Because each module includes at least some hardware even when the included hardware comprises software, each module may be interchangeably referred to as a hardware module, such as the data compression hardware module.

Figure 3:
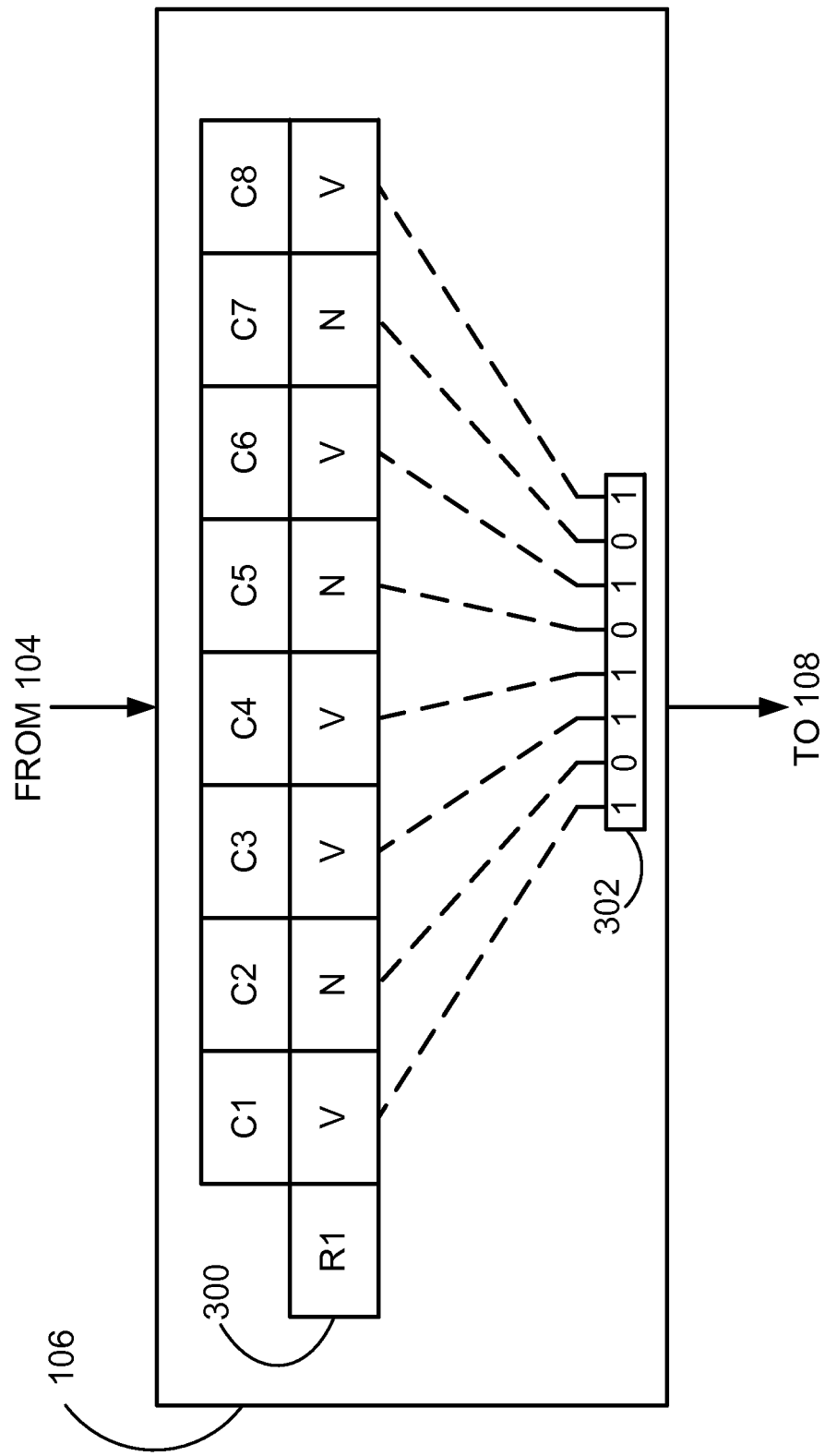
FIG. 3 is an example of a portion of the data compression module.

FIG. 3 is an example of operation of the row compression module 106. Once the row contents have been determined by the row content determination module 104, the row compression module 106 may determine if any column rows are to be compressed. An example row 300, row R1, may be part of a table having eight columns, C1 through C8. Contents of a column row of each row of the table may be compressed if the contents are NULL. In one example, the row compression module 106 may indicate compressed data in the form of a bit sequence 302, with each bit representing a column row. If a column row includes a non-NULL value, the row compression module 106 may generate a "1" and if the column row value is NULL, the row compression module 106 may generate a "0." In the example row 300, column rows containing a "V" represent non-NULL values and those containing an "N" represent a NULL value. Thus, in the example row 300, contents of column rows for columns C2, C5, and C7 are NULL, while the other column rows contain non-NULL values. The row compression module 106 may generate a bit sequence 302 of "10110101". Where the "0" bits in the second, fifth, and seventh bit places indicate that the corresponding column rows have NULL content. NULL values require more data to be transmitted than a single bit, and thus, allowing NULL values to be eliminated for purposes of transmission results in a reduced amount of data being transmitted.

Figure 4:
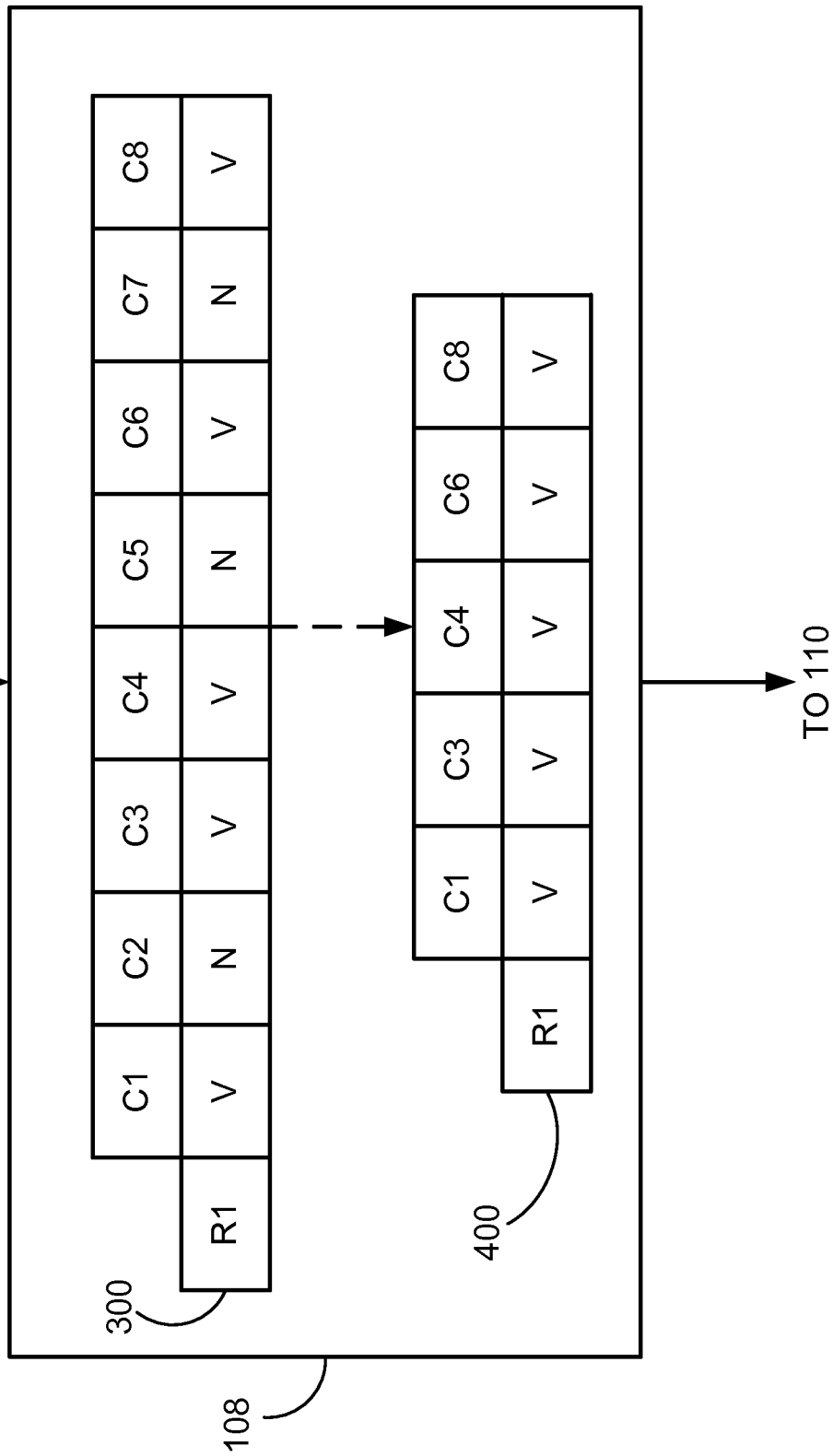
FIG. 4 is an example of another portion of the data compression module.

Each row of a table received by the row compression module 106 may be similarly analyzed by the row compression module 106, such as that described with row 300. Such analysis may result in a bit sequence for each row of the table. Once the rows have been compressed, each row can be prepared for transmission. Since each bit sequence 302 indicates which column rows are NULL, no NULL values need to be transmitted, which beneficially allows less data to be transmitted. Instead, the column rows affected may be reconstructed using the bit sequences 302. As shown in FIG. 4, for the row 300, a NULL value is contained in columns C2, C5, and C6. The transmission preparation module 108 may identify each column row having a NULL value. The transmission preparation module 108 may remove each column row having a NULL value, since the NULL value has been compressed in the bit sequence 302. A resultant transmission row 400 may be generated by the transmission preparation module 106.

Once the row compression module 106 has generated the compressed data, each row may be analyzed by the transmission preparation module 108. In one example, for each row having a compressed column row, the transmission preparation module 108 may prepare the row for transmission based on the compressed data. In rows having NULL values compressed, the transmission preparation module 108 may remove the NULL values from the row 300, such that the row to be transmitted only contains non-NULL column row values. Thus, for the row 300, the transmitted row only contains the column rows for columns C1, C4, C4, C6, and C8.

Figure 5:
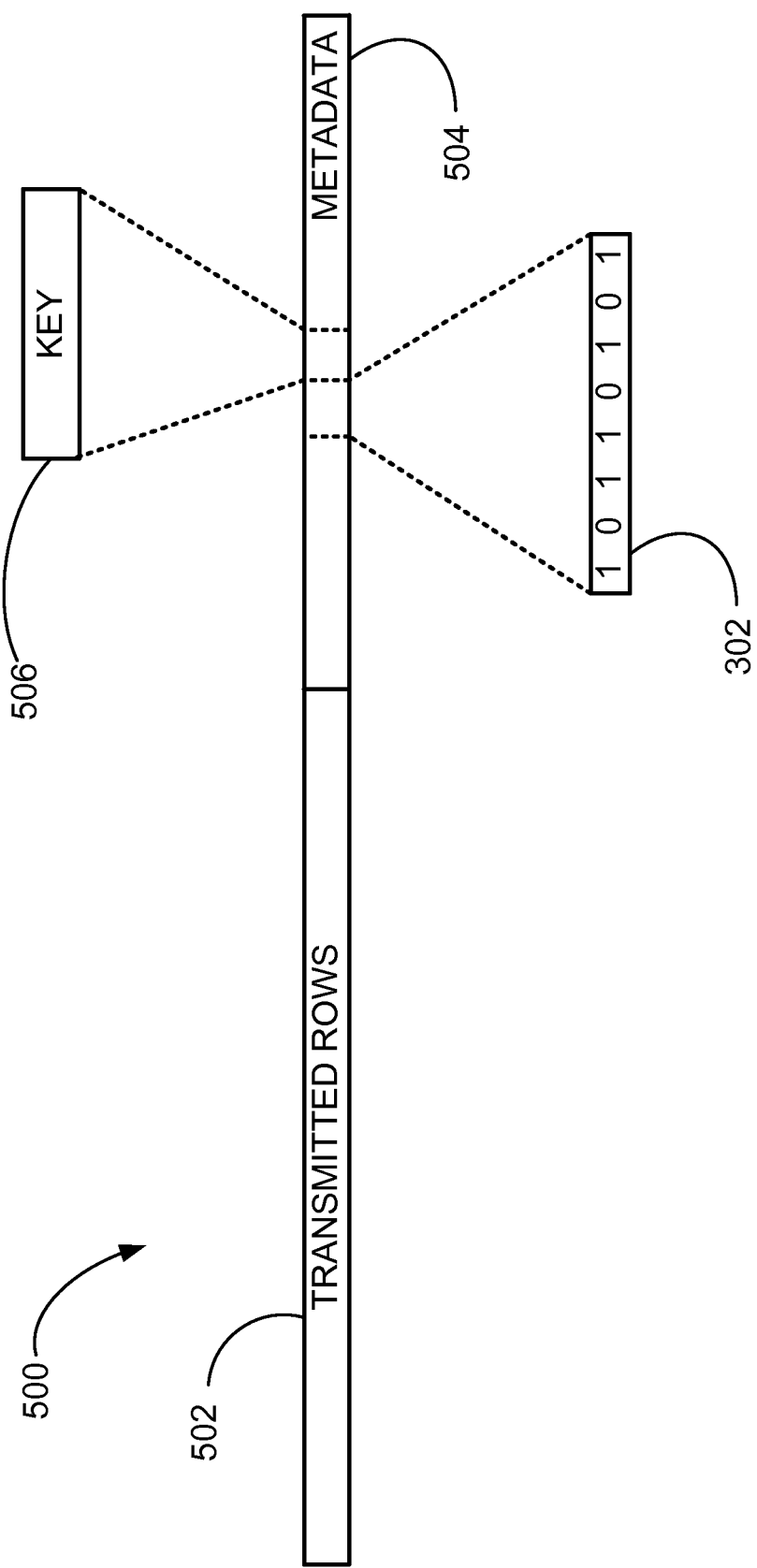
FIG. 5 is an example data stream.

The compressed and/or uncompressed rows of table to be transmitted (such as table 102), may be transmitted along with metadata. In one example, the CIG module 110 may insert the compressed data and key into the metadata. FIG. 5 shows an example of a data stream 500, which includes transmitted rows 502 and metadata 504. The transmitted rows 502 include the uncompressed row contents to be transmitted. In one example, the CIG module 110 may insert a key 506 and compressed data into the metadata 504. The key 506 may provide information regarding the compression scheme used to compress table data, as well as indicate what compressed data is being transmitted. For example, if column rows having NULL values are compressed, the key 506 may represent what each bit represents, such as "1" for NULL value and "0" for non-NULL values.

The metadata 504 may include additional information to identify the table 102, such as the numbers of rows and columns or other relevant information, such as a cyclic redundancy check (CRC) or checksum values. Each row may be represented by a bit sequence, such as bit sequence 302 for the row R1. In one example, only rows including compressed data may be represented by a bit sequence 302. Each bit sequence 302 may be preceded by a header indicating which row of a table a bit sequence 302 represents. The data stream 500 shown is but one example of how rows of a table may be transmitted. In other examples, each transmitted row may be immediately preceded by a corresponding bit sequence 302. Additional data stream configurations may be used and additional metadata may be used.

The compression of data may also be used with additional compression mechanisms allowing transmission to be even further reduced. For example, upon compressing table rows by the data compression module 100, the rows prepared for transmission may be additionally compressed, as well as the compressed data using the data compression module 106. In such a scenario, the removed contents that have been compressed do not require compression, allowing the compressed data to be compressed instead, which reduces the total amount of data requiring compression.

In another example, the data compression module 100 may compress data based on a particular value stored in a table. Some tables may include many repetitive values. Typically, each repetitive value is associated with a particular column. When transmitting an entire table, these repetitive values must also be transmitted as many times as they are present in the table. In one example, the data compression module 100 may compress data in a column row of a table row having a particular value allowing data associated with transmission of repetitive values to be reduced. For example, table 600 includes rows 602. For purposes of this example, the table 600 includes eight columns, C1 through C8 and a number of rows n (R1 through Rn). In one example, repetitive values may be predetermined and the column in which they may appear may be identified. This may be accomplished in a number of ways. For example, each table to be transmitted may be scanned by the row content determination module 104 to determine the number of values in each column. If a number of appearances of a value is greater than some predetermined threshold, the value may be eligible for specific compression. In another example, each repetitive value may be identified prior to a table being processed by the data compression module 100 and the columns in which the repetitive value may appear may also be identified.

Based on the number of actual or potential appearances of repetitive values, a bit sequence may be sized and associated for each column of a table to be transmitted. For example, in column C1 of the table 600, no repetitive values are identified, thus values may either be NULL or non-NULL. In such an instance, only a single bit need be associated with the column C1 to identify a non-repetitive non-NULL value ("0") or a NULL value ("1"). In the example table 600, general non-repetitive, non-NULL values are indicated with "V". In column C3, repetitive values V1, V2, and V3 maybe be respective contents of a column row or the column row value may be another value V or NULL. In such a scenario, a bit sequence for column C3 may indicate five different contents: repetitive values V1, V2, or V3; another value V; or NULL. Thus, the bit sequence indicates one of values V1, V2, V3, V, and NULL.

In one example, the row content determination module 104 may receive the table 600 having a plurality of rows 602. Each row may be identified and provided to the row compression module 106. Row R1 is shown as being analyzed by the row compression module 106. The row compression module 106 may be provided information as to which columns have repetitive values and how many repetitive values may exist. In such a scenario, a bit sequence for each column row may be generated and may vary in bit size depending on the number of values that may be compressed. For example, since column C3 may include 5 possible values of relevance V1, V2, V3 or V or NULL, five different bit patterns are needed. At least 3 bits would be needed for column C3 to allow for five different possibilities.

In one example, column C3 of the table 600 may include values V1, V2, or V3 that have been identified as repetitive or may include some other values, which are generally represented as "V" or may also be NULL. The data compression module 100 may identify the repetitive values, which may be compressed. Each row may be analyzed by the row content determination module 104, in which the contents of each column row of an analyzed row are identified. The analyzed rows may be subsequently received by the row compression module 106. The row compression module 106 may determine if the identified column row values are eligible for compression and compress such data. In one example, repetitive values may be predetermined by the data compression module 100 or some other component capable of relaying such values to the data compression module 100. The row compression module 106 may generate a bit sequence 604 to indicate the row compression. The bits associated with each column row may vary in number depending on the particular compression scheme. For example, in row R1 of the table 600, column C3 of the table 600 may have values of V1, V2, V3, some other value V, or NULL. Because the values V1, V2, V3 are considered as being repetitive values, they may be desired to be compressed to a number of bits that represent less data then the values themselves.

In one example, the row compression module 106 may be preconfigured to associate a number of bits with a column of a table. Repetitive values may be predetermined and stored in a library accessible by the data compression module 100. The row compression module 104 may identify each column row value and determine if the associated value is eligible for compression.

If the column row value is eligible, the row compression module 106 may determine the respective bit sequence and set those bits in the bit sequence. For example, a bit sequence 604 may represent the row R1 of table 600. Within the bit sequence 604, sub-sequences may be used to represent contents of a column row in compressed form. For example, sub-sequence 606 may represent column C3. In one example, the particular sequences may be used as follows:

| Value | Bit Sequence |
|-------|--------------|
| V     | 000          |
| V1    | 001          |
| V2    | 010          |
| V3    | 011          |
| NULL  | 100          |

In another example, any bit sequence 604 that does not indicate values V1, V2, V3, or NULL may indicate that the value in column C3 is some non-repetitive value "V," which will be transmitted, instead of a particular bit sequence such as "000". Any column identified as having repetitive values may have similar sub-sequences, with the number of bits being determined by the number of values to be distinguished.

Figure 6:
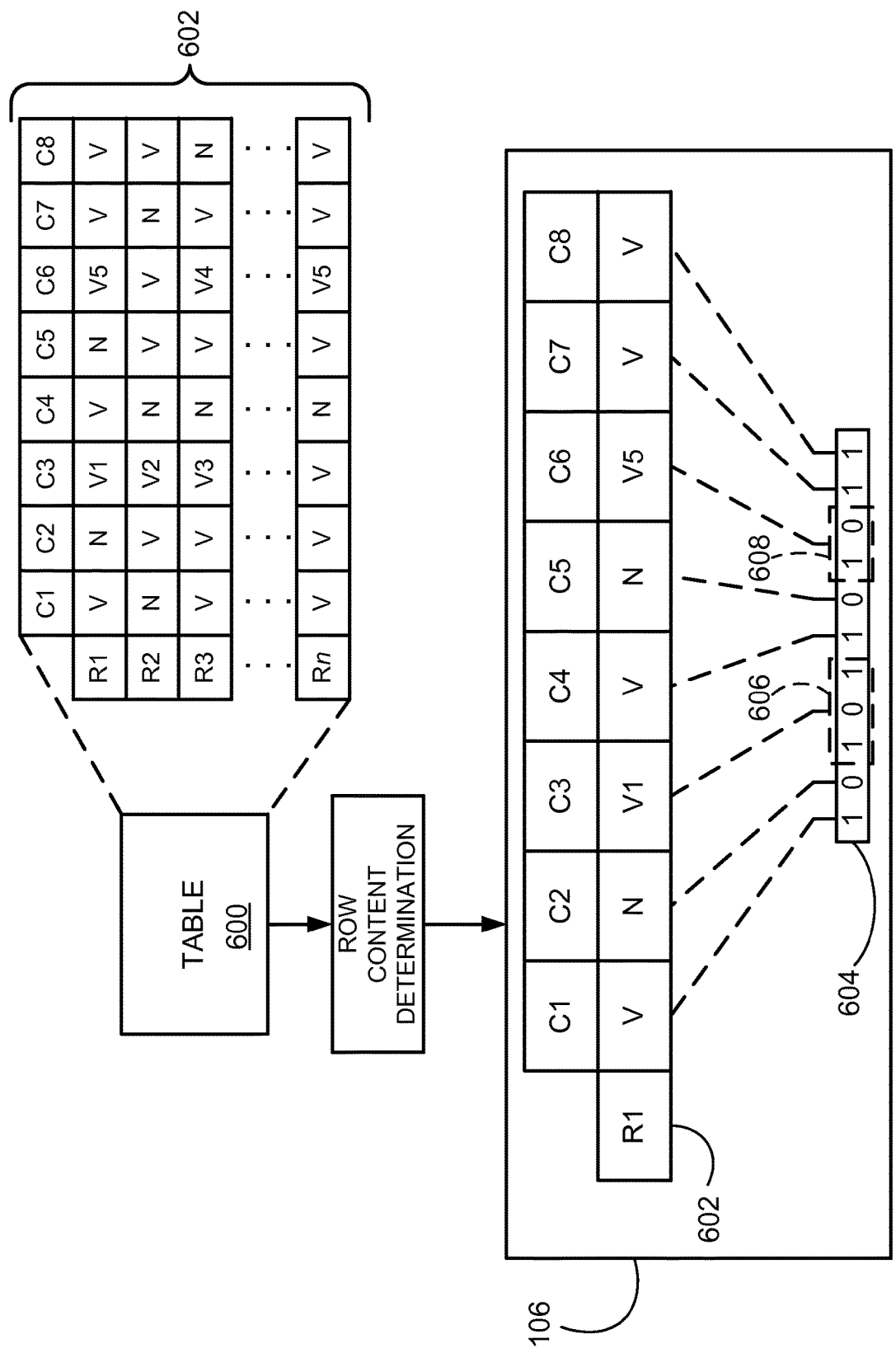
FIG. 6 is another example of a portion of the data compression module.

Similarly, column C5 may contain repetitive values V4 and V5, another value V, or NULL. This results in four different bit sequences that may be used to identify one of these four possibilities. Thus, a two-bit bit sub-sequence 608 may be used. In the example of FIG. 6, the bit sequence 602 may include a single bit representing columns C1, C2, C4, C5, C7, and C8, and multi-bit sub-sequences for columns C3 and C6.

Each row of the table 600 may be analyzed by the row compression module 106 to determine if column rows are eligible for compression. Once each row has been analyzed, the analyzed rows may be received by the transmission preparation module 108, which may prepare the rows for transmission. Similar to that described with regard to FIG. 4, the transmission preparation module 108 may remove column rows from rows that have had particular values compressed. For example, in the row R1, the values of the column rows for columns C2, C3, C5, and C6 may be determined through the corresponding bits of the bit sequence 602. Those columns may be removed from the row R1. However, since the column rows of columns C1, C4, C7, and C8 contain values that are indeterminate through the bit sequence 602, those values may be transmitted.

Similar to the data stream 500, the bit sequences for each row of table 600 may be included in metadata or another part of the data stream through the CIG module 110. A key indicating the values the compressed data represents may also be included in the metadata. Upon receipt, the key may be used to reconstruct the values representative of the corresponding bits in the bit pattern 602. The order of data in the data stream may vary across implementations. For example, each sub-sequence of the bit sequence 604 may precede the data indicative of the transmitted column row values of the corresponding row.

Figure 7:
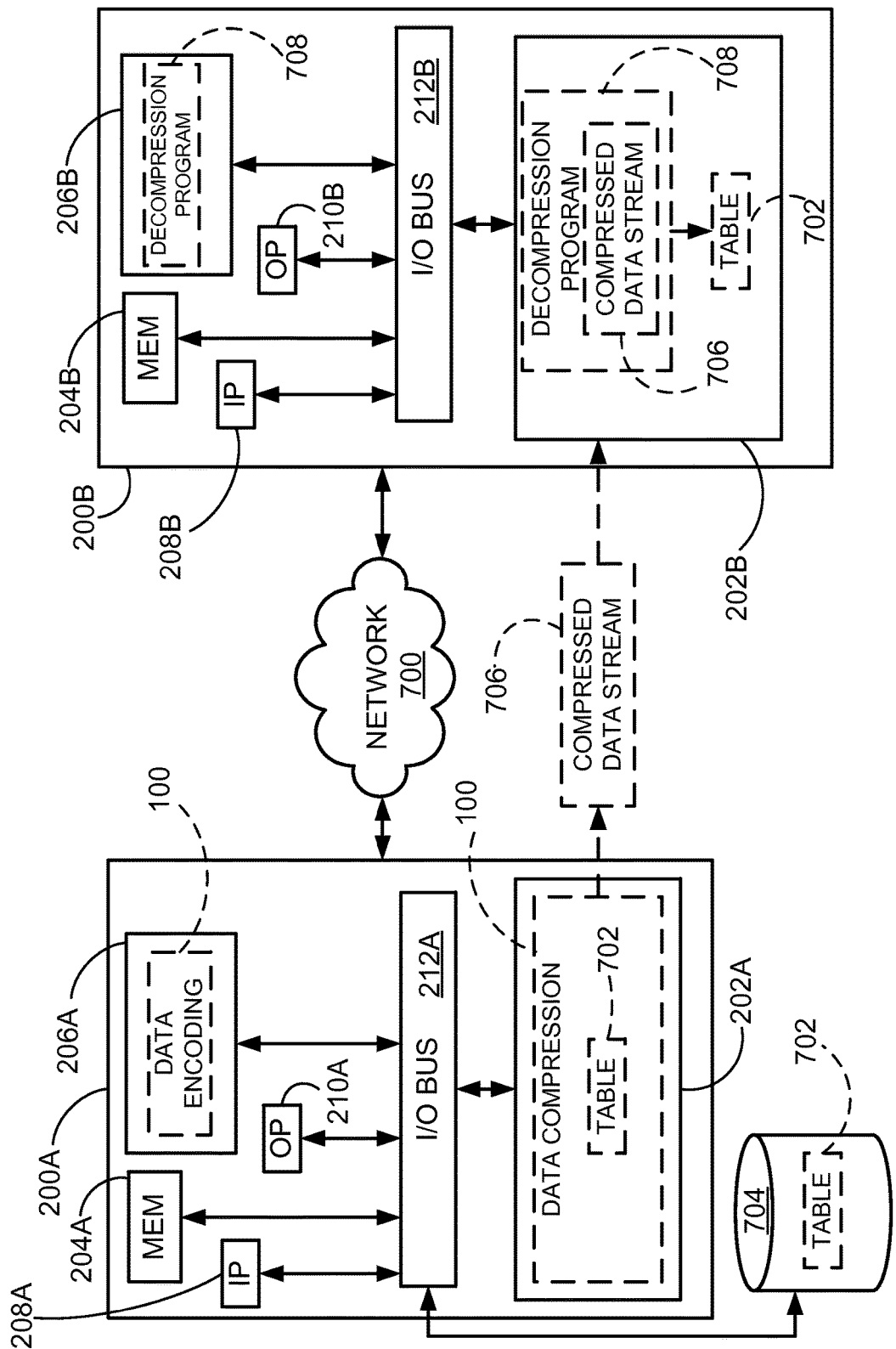
FIG. 7 is an example of computer systems in a network.

FIG. 7 is an example of a pair of computer systems 200 communicating with one another over a network 700. The network 700 may be a virtual private network, web-based, directly-connected, or some other suitable network configuration. Each computer system 200 may be individually designated as computer system 200A and computer system 200B. In one example, the computer system 200A may transmit a table 702 to the computer system 100B based on user-based input received via input peripherals (IP) 208A. The computer system 200A may implement the data compression module 100 to encode any eligible data in the table 702, which may be stored wholly or partially as a software module stored on the persistent storage devices 206A and/or alternatively in one or more memories 204A. The computer system 200A may fully or partially execute the data compression module 100 on one or more processors 202A depending on the particular implementation or the data compression module 100 may be hardware based. In one example, a table 702 may be stored a database 704. The database 704 may be independent from the computer system 200A or may be part of the persistent storage 206A.

The data compression module 100 may compress eligible data from the table 702 according to the particular compression scheme. A data stream 706 that includes compressed data, uncompressed data, and metadata associated with the table 702. The metadata may include a key, as well as the compression data. The data stream 706 may be transmitted across the network 700 to the computer system 200B. The example of FIG. 7 is but one scenario for transmission of the data stream 706. Other examples may include the data stream 706 being transmitted across the network 700 to any number of computing systems capable of receiving the data stream 706.

The computing system 200B may begin reconstructing original data from the compressed data of the data stream 706 once received by the processors 202B. In one example, a decompression program 708 may be stored in the persistent storage 206B and executed on one or more processors 202B. The decompression program 708 may use the key to decompress the data to reconstruct the original data so that a complete table 702 is obtained.

Figure 8:
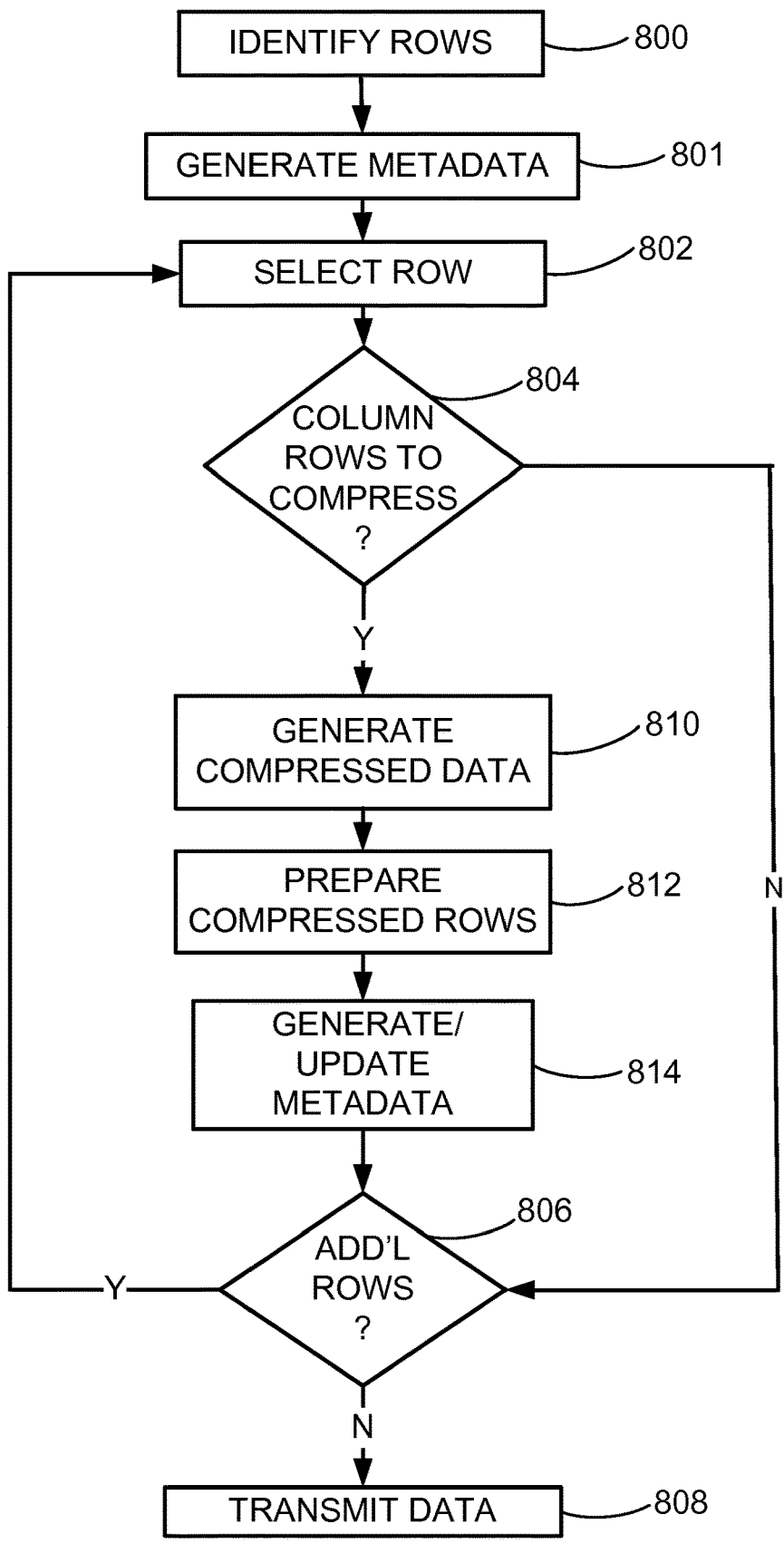
FIG. 8 is an operational flow diagram of example operation of a data compression module.

FIG. 8 is an operational flow diagram of example operation of the data compression module 100 executed on one or more processors 202 of a computer system 200. In one example, the data compression module 100 may identify rows of a table, such as table 102 (800). In various implementations, a table received by the data compression module 100 may be preprocessed such that the data compression module 100 has knowledge of contents of each row upon receipt or may analyze each row individually. Metadata for the table 102 may be generated, which may identify characteristics regarding the table, such as size, dimensions, etc. In one example, metadata may be generated prior to receipt of the table 102 by the data compression module 100. In such a scenario, the metadata may be provided to the data compression module 100 along with the table 102. The data compression module 100 may select a row for analysis (802). The data compression module 100 may determine if any column rows of a row under analysis are eligible for compression (804). If no column rows are eligible, the data compression module 100 may determine if the table contains additional rows (806). If additional rows are not present, the data making up the table may be transmitted (808).

If the row under analysis does include column rows eligible for compression, the data compression module 100 may generate compressed data for each eligible column row (810). The compressed data may take various forms. In one example, a bit value may indicate that a column row includes a NULL value or non-NULL value. In another example, one or more bits may be used for one or more columns to indicate that a particular non-NULL value is present in the column row. For example, bit sequences may be used to represent repetitive values present in a table.

The data compression module 100 may prepare the compressed row (812). In one example, this may include removing contents of any column row that has been compressed allowing only contents of uncompressed column rows to remain in a row for transmission. The data compression module 100 may also generate/update metadata associated with the compressed column rows (814). The data compression module 100 may initially generate a key indicating the compression scheme used. In one example, the data compression module 100 may also place the compressed data in the metadata or may place it in the data representing the actual table contents. If additional rows have yet to be analyzed (806), the data compression module 100 may analyze another row to determine if compression is to occur (804). If there are no additional rows, the data representing the table may be transmitted (810).

The examples herein have been provided with the context of a relational database system. However, all examples are applicable to various types of data stores, such as file systems or other data stores suitable for organizing data into tables. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system comprising:
a storage device configured to store a plurality of data tables;
a processor in communication with the storage device, the processor configured to:
receive a request to transmit a data table from the plurality of data tables, wherein the data table has a plurality of rows;
determine if contents of each column row of each row of the data table are eligible to be compressed, wherein both NULL and non-NULL values are eligible for compression;
for each column row determined to contain eligible contents:
generate compressed data representative of the contents of a respective column row; and
remove the contents of the respective column row from an associated row; and
generate a key indicative of a compression scheme used to compress contents of column rows of the data table, wherein the key is configured to indicate a compressed NULL value in response to the determination that the eligible contents contain a NULL value and to indicate a compressed non-NULL value in response to the determination that the eligible contents contain a non-NULL value; and
transmit the compressed data, the key, and the data table without content of the column rows represented by the compressed data.

2. The system of claim 1, wherein, for each column row that contains eligible contents, the compressed data comprises at least one bit indicative of the contents of the respective column row.

3. The system of claim 1, wherein the contents of each column row are eligible to be compressed if the contents are a NULL value, and wherein the compressed data for the respective column row is a single bit indicative of the NULL value.

4. The system of claim 3, wherein the processor is further configured to generate a bit sequence for each row of the data table, wherein each bit of the bit sequence corresponds to a column row of a corresponding rows, and wherein compressed data for each column row having eligible contents is a bit having a bit value different than each bit value of a bit corresponding to a column row that does not contain contents eligible to be compressed.

5. The system of claim 1, wherein the data table includes at least one column configured to include one of a plurality of predetermined values eligible to be compressed, wherein the processor is further configured to, for each row of the data table:
identify one of the predetermined values in a column row of the at least one column; and
generate a bit sequence corresponding to the identified one of the predetermined values, wherein the bit sequence is the compressed data.

6. The system of claim 1, wherein the processor is further configured to:
generate metadata to include the compressed data and the key; and transmit the metadata.

7. A method comprising:
receiving, with a processor, a request to transmit a data table having a plurality of rows from the plurality of data tables;
retrieving, with the processor, the data table from a storage device;
determining, with the processor, if contents of each column row of each row of the data table are eligible to be compressed, wherein both NULL and non-NULL values are eligible for compression;
for each column row that contains eligible contents:
generating, with the processor, compressed data representative of the contents of a respective column row; and
removing, with the processor, the contents of the respective column row from an associated row;
generating, with the processor, a key indicative of a compression scheme used to compress contents of column rows of the data table, wherein the key is configured to indicate a compressed NULL value in response to the determination that the eligible contents contain a NULL value and to indicate a compressed non-NULL value in response to the determination that the eligible contents contain a non-NULL value; and
transmitting, with the processor, the compressed data, the key, and the data table without content of the column rows represented by the compressed data.

8. The method of claim 7, further comprising generating, with the processor, the compressed data to comprise at least one bit indicative of the contents of the respective column row.

9. The method of claim 7, further comprising determining, with the processor, if contents of each column row of each row are a NULL value, and wherein the compressed data is a single bit indicative of the NULL value; and for each column row that contains a NULL value, generating, with the processor, compressed data, that is a single bit indicative of the NULL value.

10. The method of claim 9, further comprising generating, with the processor, a bit sequence for each row of the data table, wherein each bit of the bit sequence corresponds to a column row of a corresponding rows, and wherein compressed data for each column row having eligible content is a bit having a bit value different than each bit value of a bit corresponding to a column row that does not contain contents eligible to be compressed.

11. The method of claim 7, wherein the data table includes at least one column configured to include one of a plurality of predetermined values eligible to be compressed, wherein the method further comprises:
for each row of the data table:
identifying, with the processor, one of the predetermined values in a column row of the at least one column; and
generating, with the processor, a bit sequence corresponding to the identified one of the predetermined values, wherein the bit sequence is the compressed data.

12. The method of claim 8, wherein the processor is further configured generate metadata to include the compressed data and the key; and
transmitting, with the processor, the metadata.

13. A non-transitory computer-readable medium encoded with a plurality of instructions executable by a processor, the plurality of instructions comprising:
instructions to receive a request to transmit a data table having a plurality of rows from the plurality of data tables;
instructions to retrieve the data table from a storage device;
instructions to determine if contents of each column row of each row of the data table are eligible to be compressed, wherein both NULL and non-NULL values are eligible for compression;
for each column row that contains eligible contents:
instructions to generate compressed data representative of the contents of a respective column row; and
instructions to remove the contents from the respective column row from an associated row;
instructions to generate a key indicative of a compression scheme used to compress contents of column rows of the data table, wherein the key is configured to indicate a compressed NULL value in response to the determination that the eligible contents contain a NULL value and to indicate a compressed non-NULL value in response to the determination that the eligible contents contain a non-NULL, value; and
instructions to transmit the compressed data, the key, and the data table without content of the column rows represented by the compressed data.

14. The non-transitory computer-readable medium of claim 13, wherein the plurality of instructions further comprises instructions to generate the compressed data to comprise at least one bit indicative of the contents of the respective column row.

15. The non-transitory computer-readable medium of claim 13, wherein the plurality of instructions further comprises:
instructions to determine if contents of each column row of each row are a NULL value, and wherein the compressed data is a single bit indicative of the NULL value; and for each column row that contains a NULL value, instructions to generate compressed data that is a single bit indicative of the NULL value.

16. The non-transitory computer-readable medium of claim 15, wherein the plurality of instructions further comprises instructions to generate a bit sequence for each row of the data table, wherein each bit of the bit sequence corresponds to a column row of corresponding rows, and wherein compressed data for each column row having eligible contents is a bit having a bit value different than each bit value of a bit corresponding to a column row that does not contain contents eligible to be compressed.

17. The non-transitory computer-readable medium of claim 13, wherein the data table includes at least one column configured to include a one of a plurality of predetermined values eligible to be compressed, wherein the plurality of instructions further comprises, for each row of the data table:
instructions to identify one of the predetermined values in a column row of the at least one column; and
instructions to generate a bit sequence corresponding to the identified one of the predetermined values, wherein the bit sequence is the compressed data.

18. The non-transitory computer-readable medium of claim 13, wherein the plurality of instructions further comprises:
instructions to generate a key indicative of a compression scheme used to compress contents of column rows of the data table;
instructions to generate metadata to include the compression data and the key; and
instructions to transmit the metadata.

\* \* \* \* \*